Sept. 20, 1938.  J. H. WOODALL  2,130,867
EDGE GUARD FOR FRUIT BOXES
Filed March 28, 1935  2 Sheets-Sheet 1
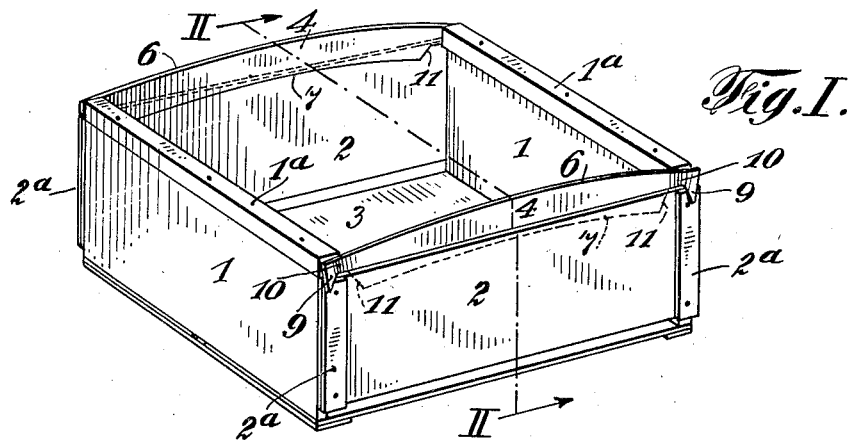
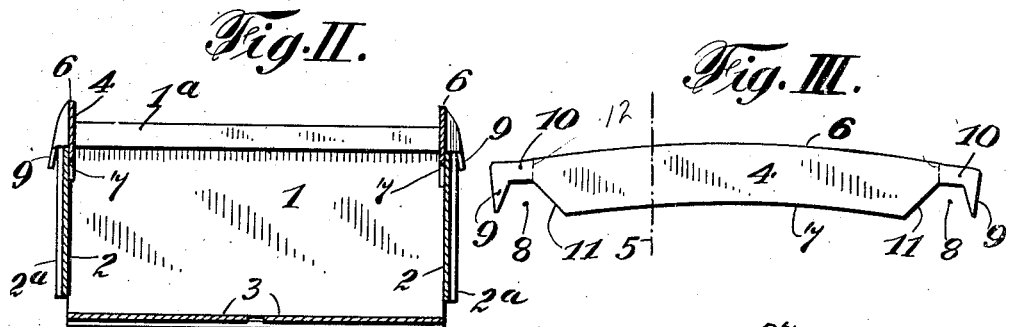
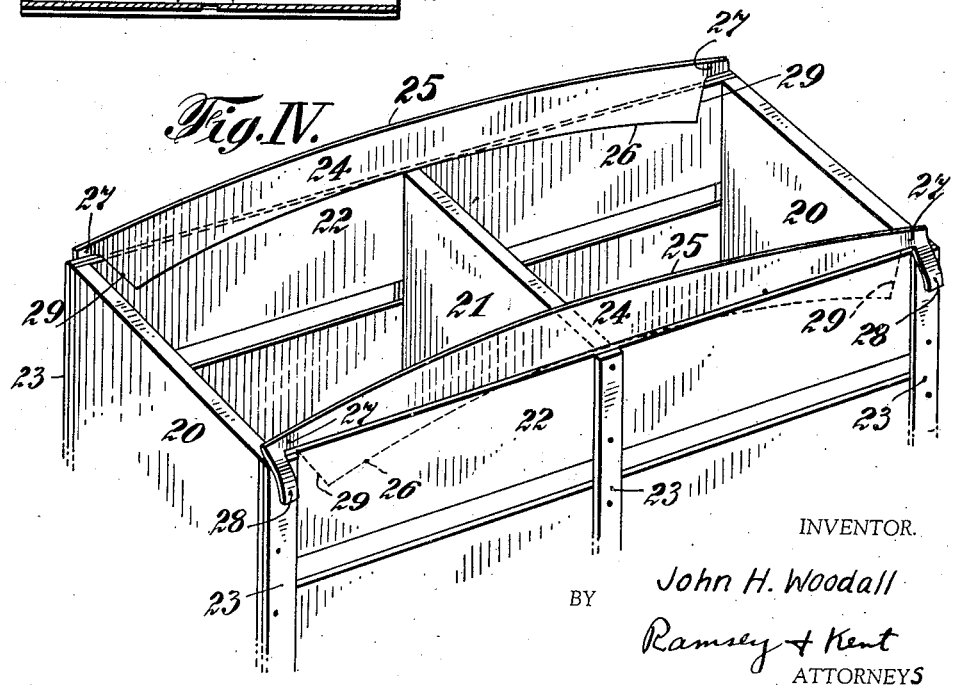
INVENTOR.
John H. Woodall
BY Ramsey + Kent
ATTORNEYS

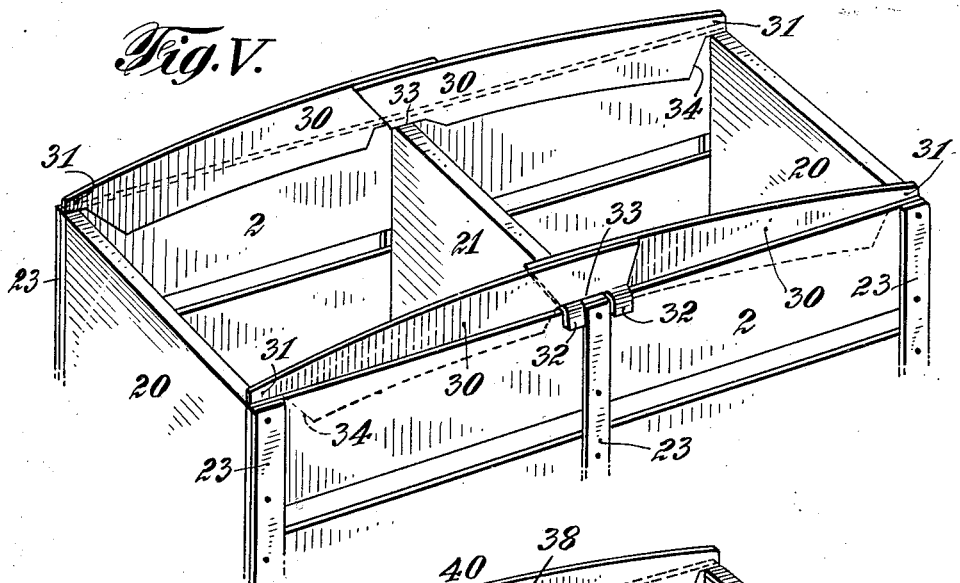
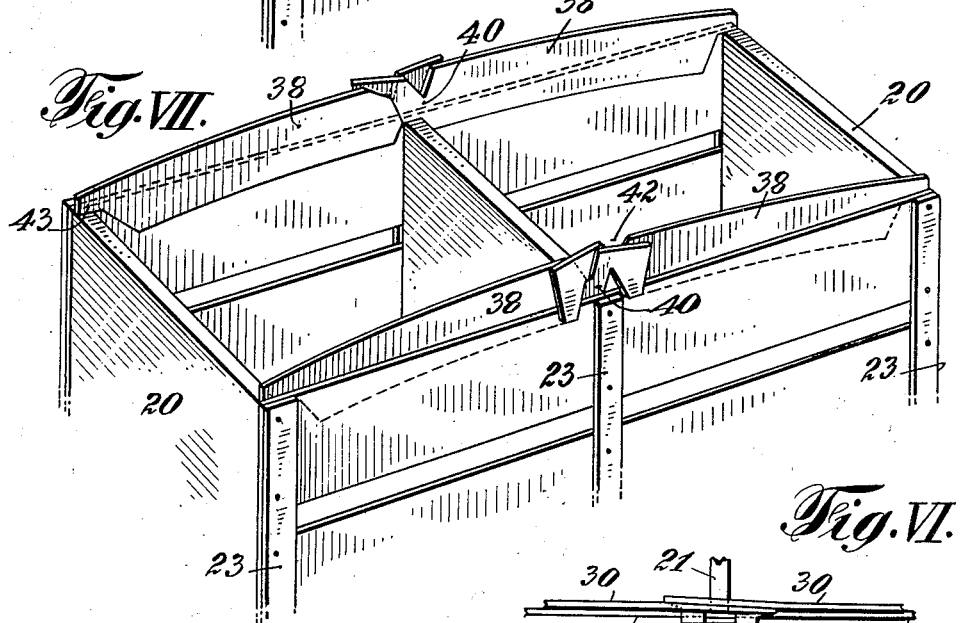
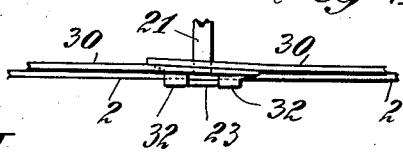
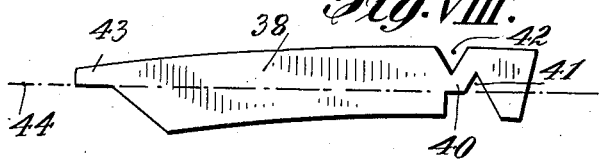

Patented Sept. 20, 1938

2,130,867

UNITED STATES PATENT OFFICE 2,130,867

EDGE GUARD FOR FRUIT BOXES

John H. Woodall, Woodland, Ga.

Application March 28, 1935, Serial No. 13,372

10 Claims. (Cl. 217—3)

This invention relates to edge guards for fruit boxes, the boxes being customarily used to pack oranges, apples, grapefruit, lemons, peaches, tomatoes, etc.

In packing fruit in boxes it is customary to fill the box heaping full, and then close the box with a springy lid which exerts a compressive force upon the contents of the box, thereby preventing interior movement of the contents of the box during shipment. An ordinary practice is to so fill the box that the column of fruit initially extends to some little distance above the upper edge of the box; and then to apply the lid under pressure, thereby compressing the column of fruit to a certain extent. During this compression of the column of fruit, there is a certain amount of movement of the upper layers of fruit past the upper edge of the box, which tends to scar and injure the fruit. To overcome this difficulty, edge guards have been heretofore applied to the upper edge of the box to guide and yieldingly support the upper layers of fruit during the compression of the fruit column. The guiding action of these edge guards is much like the action of a shoe-horn in guiding the foot into a shoe. After the package has been completed, these edge guards serve to bridge the space between the upper edge of the box and the bulged lid, and thus furnish lateral support for the upper layer of fruit.

The general object of the present invention is to improve edge guards for fruit boxes, both from the standpoint of the effectiveness of the edge guard and from the standpoint of manufacturing advantages.

Another object of the invention is to provide an inexpensive edge guard of increased effectiveness and utility.

A specific object of the invention is to provide an edge guard which can be effectively applied to the box with the desired projection of the guard above the upper edge of the box regardless of manufacturing variations in the size of the box.

Another object is to provide an edge guard which does not require cooperation with the ends of the box to hold it in place.

These and other objects of the invention are accomplished by means of an edge guard of paper material which is cut transversely of the grain of the paper, thereby giving the guard greatly increased strength and stiffness along vertical lines. In use the guard lies against the inner side wall of the box; and preferably the guard is provided with integral tabs which slide downwardly on the exterior wall of the box, thereby securing the guard to the box in much the same manner that an ordinary slide type of paper clip is secured to a sheet of paper. This method of attaching the guard to the box permits a considerable range of adjustment of the projecting height of the guard above the upper edge of the box, regardless of manufacturing variations in the size of the box. Also, the effectiveness of the integral tabs in a paper clip fashion is greatly enhanced by the increased vertical stiffness of the guard due to the vertical extending grain of the paper material. Of course, "paper material" includes heavy paper, cardboard, pasteboard, etc. Additionally, the vertical stiffening of the guard due to the vertical grain of the material, improves the general effectiveness of the guard and/or permits the guard to be made out of light weight paper stock, thus reducing the cost of the guard.

Fig. I is an isometric view of a fruit box with guards of the present invention applied thereto, the particular box being of the type often referred to as a "tomato lug".

Fig. II is a vertical section taken on the line II—II of Fig. I.

Fig. III is a side view of the guard shown in Figs. I and II.

Fig. IV is an isometric view of guards of the present invention applied to a partitioned box, such as is often used for oranges, and grapefruit.

Fig. V is an isometric view of a modified guard of the present invention applied to a partitioned box.

Fig. VI is a detail plan view showing the overlapped ends of the individual guard members as applied to the box of Fig. V.

Fig. VII is an isometric view showing another modified form of guard applied to a partitioned box.

Fig. VIII is a side view of one of the individual guard elements shown in Fig. VII.

Reference will first be had to Figures I, II and III. The box is usually constructed of wood, and has relatively thick ends 1, 1, relatively thin sides 2, 2, and a bottom 3. The ends 1, 1 of the box usually include separate strips 1ª, 1ª which are nailed to the upper edge of the body portion of the ends and project above the sides 2, 2. Frequently the strips 1ª, 1ª overhang toward the interior of the box, and sometimes the bottom overhanging edges of the strips are chamfered. Sometimes the sides of the box are reinforced with vertically extending overlying strips 2ª, 2ª, but other times these strips are omitted.

The edge guard is cut out of suitable paper material, preferably with the grain of the material extending vertically, i. e., parallel to the line 5 in Fig. III. The upper edge 6 of the guard is preferably a slight curve conforming to the bulged contour of the lid applied to the box; and the lower edge 7 of the guard may also be a curve which makes for economy by permitting the guards to be cut in nested relation. Near the ends of the guard, areas of the paper material are cut away at 8, 8, leaving downwardly projecting tabs 9, 9, horizontally extending necks 10, 10, and inclined edges 11, 11. In some cases it may be desirable to place score lines at 12 to facilitate flexing of the ends of the guard.

The guard is applied to a tomato lug as shown in Fig. I, the face of the guard lying against the interior surface of the side 2, the necks 10, 10 extending across the top edge of the side 2, and the tabs 9, 9 extending downwardly on the exterior of the side, thereby securing the guard in place. Preferably, the necks 10, 10 are made long enough so that the inclined edges 11, 11 do not engage the box ends 1, 1 (including the strips 1ª, 1ª). This permits the guard to be properly applied to the box, regardless of manufacturing variations in its length. Also, the tabs 9, 9 are preferably made sufficiently long to secure the guard in a paper clip fashion, even though the guard be not depressed sufficiently to bring the necks 10, 10 in contact with the upper edge of the sides 2, 2. Thus, a considerable range of adjustability is provided, regardless of manufacturing variations of the height of strips 1ª, 1ª. Also, the guard may, in some cases, be initially applied to the box in an elevated position and be depressed by the application of the lid and the compression of the column of fruit.

In Fig. IV the box has relatively thick ends 20, 20 and a relatively thick partition 21. As usual, the box has relatively thin sides 22, 22 which may or may not be reinforced with various vertical strips 23. Two identical guards are used as shown. The guard 24 may have a curved upper edge 25 conforming to the bulged contour of an applied lid. The lower edge 26 of the guard is so curved that when the guard is in position, the center portion of the guard rests directly on top of the partition 21, with the end portions of the guard lapped against the sides of the box. Adjacent to its ends the guard has longitudinally extending neck portions 27, 27 and depending tabs 28, 28.

It will be seen that the guard is applied to the box in a manner analogous to the guard of Figs. I to III. The necks 27, 27 are sufficiently long, and the guard sufficiently short, to prevent any interference between the inclined edges 29, 29 and the ends of the box, regardless of manufacturing variations of the size of the box. If desired, the guard can be applied with the necks 27, 27 initially out of contact with the upper edge of the box, as explained in connection with Fig. I.

In Figs. V and VI the box is the same as the box of Fig. IV; but with the form of guard shown, it takes four identical guard members (instead of two) for the box. Each guard member 30 has the configuration shown in the drawings, the material being so cut away adjacent to one end as to leave a projecting arm 31, and being so cut away near the other end as to leave a downwardly projecting tab 32. In applying the first guard member to one side of the box, the guard member is lapped against the inner side wall with the arm 31 resting on the end 20 of the box, and tab 32 is flexed outwardly to the exterior of the box, as shown. In applying the second guard member to the same side of the box, the guard member is similarly placed except that the neck portion 33 of the second guard extends over the tab 32 of the first guard, as shown in Fig. V. The fingers 31 are made sufficiently long, and the guard sufficiently short, to take care of manufacturing variations of the length of the box without the inclined ends 34 engaging the ends of the box. Thus the projecting height of the guard, when applied to the box, is the same regardless of manufacturing variations in the length of the box. Where the box is provided with a center reinforcing strip 23, the guard may be of such length that the tabs 32 of the two overlapping guard elements are on opposite sides of the strip 23, as shown in the drawings. Where a center strip 23 is not used, the neck portion 33 may be made shorter so that tabs 32 either lie edge-to-edge, or overlap upon one another.

In Fig. VII the box is the same as in Figs. IV and V, and may or may not be provided with reinforcing strips 23. There are four identical guard elements 38; and the end of each guard which is toward the box end is the same as the corresponding end of the guard shown in Fig. V. Extending upwardly from the neck portion 40 of the guard is a supplementary notch 41; and extending downwardly from the top edge of the guard is supplementary notch 42. This construction is best shown in Fig. VII, the dot-dash line 44 representing the position of the upper edge of the side of the box. The first guard applied to one side of the box is applied in the same manner as the first guard shown in Fig. V. Then the second guard applied to the same side of the box is applied with the supplementary notch 41 of the second guard interlocking with the notch 42 of the first guard, as shown in Fig. VII. The neck 40 and the projecting horizontal arm 43 at the other end of the guard are made sufficiently long to take care of manufacturing variations of the size of the box.

It will be understood that each of the guards of Figs. V–VIII has its upper edge preferably formed in an approximate half arc, as compared to the bulged contour of an applied box lid. The form of guard shown in Figs. I–III may also be used on partitioned boxes (four guards to a box) if the upper edge be formed in a half arc. All forms of the guard disclosed are preferably cut with the grain of the paper material extending vertically, the same as in Figs. I–III, inclusive. It will be understood that the practical limitations as to the thinness with which sheet material can be shown in a small size drawing, result in disproportionate thickness of the guards as shown in the drawings.

In compliance with the patent statutes I have disclosed the best forms in which I have contemplated applying my invention, but it will be understood that these forms are illustrative and that the scope of the invention is defined by the claims.

I claim:

1. An edge guard for fruit boxes comprising an elongated band of paper material with the grain of the material extending transversely of the length of the band, the band being adapted to be placed against a side wall of the box with its length in a substantially horizontal position and with a laterally unsupported zone of the band projecting above the side wall, whereby the grain of the band extends substantially vertically and stiffens said projecting zone to resist lateral bending of the zone.

2. An edge guard for fruit boxes comprising an elongated band of paper material having the grain of the material extending transversely of the length of the band, the width of the band being small relative to the height of the box and the band having means to secure it in position against a side wall of the box with its length in a substantially horizontal position and with a laterally unsupported zone of the band projecting above the side wall, whereby the grain of the band extends substantially vertically and stiffens said projecting zone to resist lateral deflection of the zone.

3. An edge guard for fruit boxes comprising an elongated band adapted to be positioned adjacent to the inner surface of a side wall of a box, one end of the band being notched from the bottom thereby providing a tab to be displaced to the exterior surface of the side wall, and the same end of the band being notched from the top to receive in interlocking relation the corresponding end of another band.

4. An edge guard for fruit boxes comprising an elongated band adapted to be positioned adjacent to the inner surface of a side wall of a box, the lower edge portion of one end of the band being cut away leaving a tab to be displaced to the outer surface of the side wall, and the cut away portion extending longitudinally to permit the tab of a second similar band to be passed through the cut away portion to the exterior of the side wall of the box.

5. An edge guard for fruit boxes comprising an elongated band of paper material having the grain of the material extending transversely of the length of the band, the band being adapted to lie against the inner surface of a side wall of a box, a lower portion of the band being cut away adjacent to the end of the band leaving the band with a localized edge portion extending lengthwise of the band and located inwardly of the longitudinal edges of the band proper and also providing the band with a downwardly projecting tab connected to the body of the band by a neck portion extending longitudinally of the band, the neck portion being adapted to extend across the top edge of the box with the tab frictionally engaging the outer side wall of the box to hold the guard in place while the box is being filled.

6. An edge guard for fruit boxes comprising an elongated band of paper material, the band being adapted to lie against the inner surface of a side wall of a box, a lower portion of the band being cut away adjacent to the end of the band, leaving the band with a localized edge portion extending lengthwise af the band and located inwardly of the longitudinal edges of the band proper and also providing the band with a downwardly projecting tab connected to the body of the band by a neck portion extending longitudinally of the band, the neck portion being adapted to extend across the top edge of the box with the tab frictionalllly engaging the outer side wall of the box to hold the guard in place while the box is being filled.

7. An edge guard for fruit boxes comprising an elongated unfolded band adapted to be positioned against the inner surface of a side wall of a box, a lower portion of the band being cut away in a zone adjacent to but spaced from one end of the band, leaving the band with a localized edge portion extending lengthwise of the band and located inwardly of the longitudinal edges of the band proper and also providing the end portion of the band with a downwardly projecting tab to be displaced to and lie against the outer vertical surface of the side wall of the box, and the other end of the band being provided with an arm projecting longitudinally of the band to rest on the top of the end wall of the box.

8. An edge guard for fruit boxes comprising an elongated unfolded band adapted to be positioned against the inner surface of a side wall of a box, a lower portion of the band being cut away in a zone adjacent to but spaced from one end of the band, leaving the band with a localized edge portion extending lengthwise of the band and located inwardly of the longitudinal edges of the band proper and also providing the end portion of the band with a downwardly projecting tab to be displaced to and lie against the outer vertical surface of the side wall of the box, and the other end of the band being provided with an arm projecting longitudinally of the band to rest on the top of the end wall of the box, said arm being sufficiently long to support the guard at the same level regardless of manufacturing variations in the length of the box.

9. An edge guard for fruit boxes comprising an elongated band adapted to be positioned against the inner surface of a side wall of a box, a lower portion of the band being cut away in a zone adjacent to but spaced from each end of the band, leaving localized edge portions extending lengthwise of the band and located inwardly of the longitudinal edges of the band proper and also providing each end portion of the band with a downwardly projecting tab to be displaced to and lie against the outer vertical surface of the side wall of the box.

10. An edge guard for fruit boxes comprising an elongated band of paper material with the grain of the material extending transversely of the length of the band, the band being adapted to be positioned against the inner surface of a side wall of a box, a lower portion of the band being cut away in a zone adjacent to but spaced from each end of the band, leaving localized edge portions extending lengthwise of the band and located inwardly of the longitudnal edges of the band proper and also providing each end portion of the band with a downwardly projecting tab to be displaced to and lie against the outer vertical surface of the side wall of the box.

JOHN H. WOODALL.